Dec. 12, 1961 S. HAYDEN 3,013,143
WELDING CONTACTOR
Filed Oct. 24, 1960

INVENTOR.
STEPHEN HAYDEN
BY
W. B. Harpman
ATTORNEY

3,013,143
WELDING CONTACTOR
Stephen Hayden, 705 S. Schenley Ave.,
Youngstown, Ohio
Filed Oct. 24, 1960, Ser. No. 64,439
4 Claims. (Cl. 219—130)

This invention relates to a welding contactor and more particularly to a device for establishing a welding circuit with a workpiece.

The principal object of the invention is the provision of a welding contactor that will maintain an electrical contact in frictional engagement with a workpiece under varying conditions.

A further object of the invention is the provision of a welding contactor incorporating spring and lever means for maintaining an electrical contact plate in engagement with a workpiece.

A still further object of the invention is the provision of a welding contactor incorporating a lever and a spring arranged for moving a contact member into engagement with a workpiece and holding the same thereagainst.

A still further object of the invention is the provision of a simple and efficient welding contactor which may be easily and inexpensively fabricated and which is structurally strong and provides a good electric contact with a workpiece. The welding contactor disclosed herein comprises a device adapted to be positioned adjacent a workpiece and arranged to maintain an electric contact plate in engagement with the workpiece without being fastened to the workpiece in any way. Those skilled in the welding art will recognize that electric welding requires a return or ground circuit from the workpiece to the source of electrical energy and that it has heretofore been customary to employ a clamp which had to be manually affixed to the workpiece. In welding tanks and other large objects which require frequent repositioning to make available the seams for the welder to work upon, such clamps become difficult to maintain as they must constantly be removed and replaced.

The present invention relates to a welding contactor which is simply positioned beside the workpiece such as a tank and which is provided with a movable contact plate and lever and spring means for moving it into engagement with the workpiece so that the workpiece may be moved and the contactor will still maintain a suitable electrical connection therewith. The device, therefore, expedites the welding of the tank or other workpiece as there is no need of removing and replacing clamps and all of the welder's time may be employed in welding.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
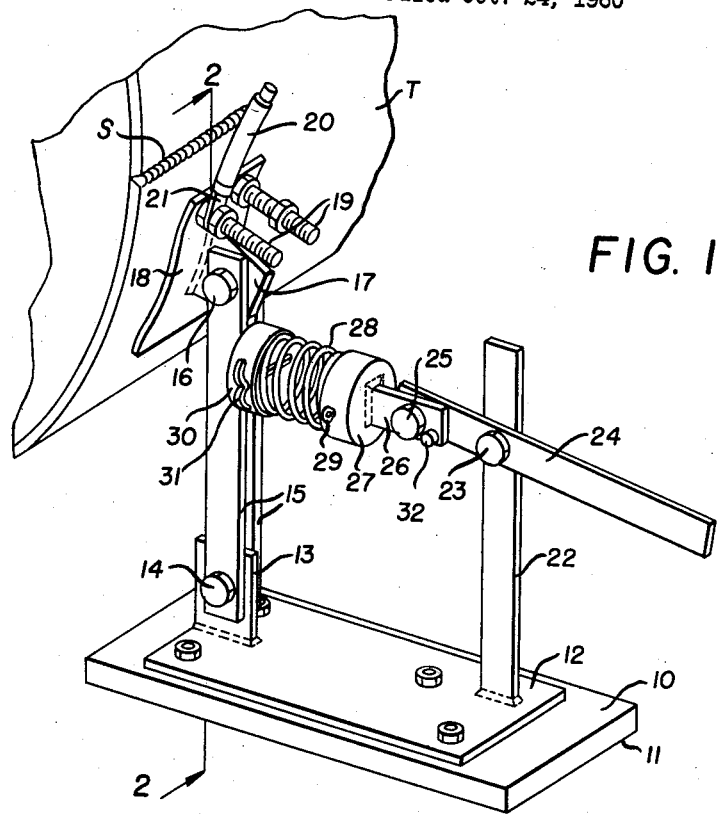
FIGURE 1 is a perspective view of the welding contactor showing the same in engagement with a portion of a cylindrical workpiece.

By referring to the drawings and FIGURE 1 in particular, it will be seen that the contactor comprises a base 10 preferably formed of fibre having an insulating bottom portion 11 and supporting base 12 which is secured thereto by fasteners.

The secondary base 12 has a vertically positioned bracket 13 on one end which is apertured and through which a pivot pin 14 is positioned so as to movably secure a pair of support arms 15 thereto. The support arms 15 normally extend vertically above the bracket 13 and are also apertured at their uppermost ends to receive a secondary pivot pin 16 which also passes through an apertured secondary bracket 17 on a contact plate 18.

The contact plate 18 is provided with a pair of threaded studs 19 to one or both of which an electric conductor cable 20 having an apertured terminal 21 may be affixed. The cable 20 comprises the ground or return circuit in an electric welding circuit and the contact plate 18 is adapted to be positioned against a workpiece such as a cylindrical tank T as partially shown in FIGURE 1. A welded seam S is shown on the tank.

In order that the contact plate 18 may be held in engagement against the tank T means is provided for moving the contact plate 18 into engagement with the tank T and maintaining such engagement under spring tension. Said means comprises a vertical arm 22 positioned on the secondary base 12 in spaced relation to the bracket 13. An aperture near the upper end of the vertical arm 22 carries a third pivot pin 23 which is positioned through an apertured lever 24 thereby pivoting the same to the vertical arm 22. A short end of the lever 24 is pivoted by a fourth pivot pin 25 to an apertured extension 26 on a cup 27 which in turn fits one end of a coil spring 28. The spring 28 is secured in the cup 27 by a transversely positioned fastener 29. The other end of the coil spring 28 is secured in a secondary cup 30 which is mounted on the support arms 15 and a secondary fastener 31 secures the coil spring 28 therein.

Figure 2:
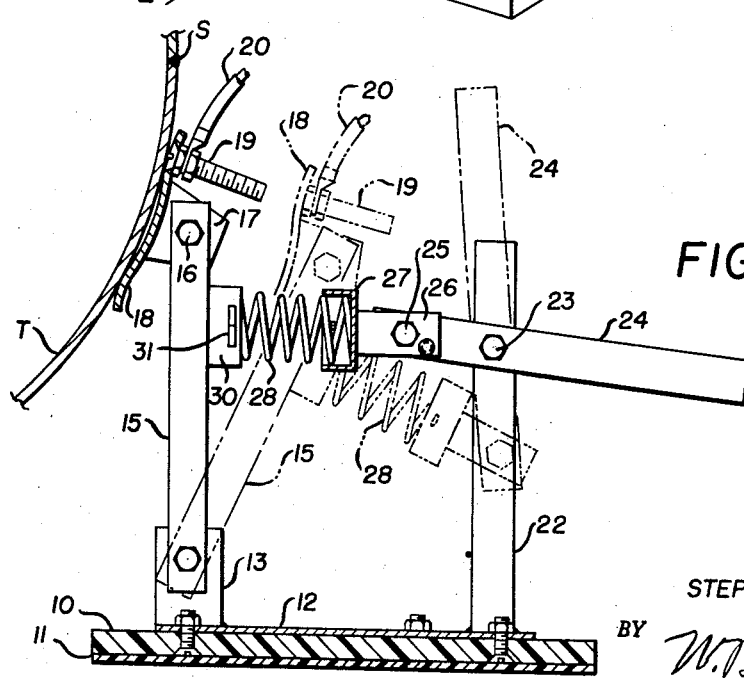
FIGURE 2 is a vertical section on line 2—2 of FIGURE 1.

In order that the lever 24 and the extension 26 on the cup 27 may be held in substantial axial alignment as illustrated in FIGURES 1 and 2 in solid lines, a locking pin 32 is mounted on the extension 26 and adapted to engage a registering socket in the lever 24. By referring to FIGURE 2 of the drawings, it will be seen that broken lines illustrate the position of the lever 24, the contact plate 18 and the support arms 15 in retracted position and it will be observed that the coil spring 28 is shown in fully extended position in broken lines whereas solid lines show it in tensioned position.

It will be observed that the action of the welding contactor is such that it can be positioned adjacent a workpiece, for example, the tank T as illustrated herein with the contact plate 18 out of engagement therewith and that by moving the lever 24 from vertical to horizontal position the contact plate 18 will move outwardly and into engagement with the workpiece and be maintained there under tension of the spring 28. When the workpiece is moved or revolved within the effective area of the welding contactor, the device will maintain the contact plate 18 thereof in electrical contact with the workpiece.

It will thus be seen that a welding contactor has been disclosed which meets the several objects of my invention, and having thus described my invention, what I claim is:

1. A welding contactor for maintaining an electrical contact with a workpiece and comprising an insulated base, a vertical support arm pivoted to said base, a contactor plate pivoted to said support arm, a vertical arm on said base in spaced relation to said pivoted support arm, a lever pivoted to said vertical arm, a coil spring having one end attached to one end of said lever and the other end secured to one side of said support arm and positioned between said lever and said support arm and means for holding said lever and coil spring in axial alignment urging said contactor plate into engagement with said workpiece, at least one terminal on said contact for securing an electrical conductor thereto.

2. The welding contactor set forth in claim 1 and wherein a cup is positioned on said support arm and a cup having an extension thereon is pivotally mounted on said lever and said coil spring has its respective ends secured in said cups.

3. The welding contactor set forth in claim 1 and wherein said base has a vertical bracket thereon and said support arm is pivoted to said bracket and wherein said contactor plate has a secondary bracket thereon and said support arm is pivoted to said secondary bracket.

4. A welding contactor having a contact plate and means for holding said contact plate under tension against a workpiece adjacent thereto, said contactor comprising a base, a bracket on one end of said base and a pair of support arms pivoted to said bracket and to said contact plate, a terminal on the contact plate for attaching an electrical conductor thereto, said contact plate having a major portion thereof positioned at right angles to said support arms and outwardly of said base, a vertical arm on said base in spaced relation to said bracket, a lever pivoted to said vertical arm, a pair of cups having a coil spring caged therebetween, one of said cups mounted on said support arms and the other of said cups having an apertured axial extension pivoted to said lever, a locking pin on said extension and a registering formation on said lever for holding said lever, said cups and axial extension and said spring in axial alignment whereby said spring urges said supporting arms and contact plate outwardly from said base.

References Cited in the file of this patent
UNITED STATES PATENTS

| | | |
|---|---|---|
| 2,323,450 | Brosco | July 6, 1943 |
| 2,439,371 | Sandbery | Apr. 6, 1948 |
| 2,474,534 | Knost | June 28, 1949 |